United States Patent
Nguyen et al.

(10) Patent No.: US 7,350,101 B1
(45) Date of Patent: Mar. 25, 2008

(54) SIMULTANEOUS WRITING AND RECONSTRUCTION OF A REDUNDANT ARRAY OF INDEPENDENT LIMITED PERFORMANCE STORAGE DEVICES

(75) Inventors: Thai Nguyen, Thornton, CO (US); Charles A. Milligan, Golden, CO (US); Michael L. Leonhardt, Longmont, CO (US); Stephen S. Selkirk, Westminster, CO (US); Gerald O'Nions, Toulouse (FR); James P. Hughes, Minneapolis, MN (US)

(73) Assignee: Storage Technology Corporation, Louisville, CO (US)

( * ) Notice: Subject to any disclaimer, the term of this patent is extended or adjusted under 35 U.S.C. 154(b) by 756 days.

(21) Appl. No.: 10/329,222

(22) Filed: Dec. 23, 2002

(51) Int. Cl.
*G06F 11/00* (2006.01)

(52) U.S. Cl. .......................... 714/6; 711/114
(58) Field of Classification Search .................. 714/6; 711/114
See application file for complete search history.

(56) References Cited

U.S. PATENT DOCUMENTS

| | | | | |
|---|---|---|---|---|
| 5,301,297 A | * | 4/1994 | Menon et al. ............. 711/114 |
| 5,572,659 A | * | 11/1996 | Iwasa et al. .................. 714/6 |
| 5,600,783 A | * | 2/1997 | Kakuta et al. ................. 714/6 |
| 5,802,264 A | * | 9/1998 | Chen et al. ..................... 714/6 |
| 6,289,415 B1 | * | 9/2001 | Johnson ....................... 711/111 |
| 6,529,997 B1 | * | 3/2003 | Debiez et al. .............. 711/114 |
| 6,532,548 B1 | * | 3/2003 | Hughes ........................... 714/6 |
| 6,625,748 B1 | * | 9/2003 | Tanaka et al. .................. 714/6 |
| 6,820,211 B2 | * | 11/2004 | Kalman ........................... 714/6 |
| 6,959,399 B2 | * | 10/2005 | King et al. ..................... 714/6 |
| 2002/0038436 A1 | * | 3/2002 | Suzuki ............................ 714/6 |
| 2002/0174295 A1 | * | 11/2002 | Ulrich et al. ................ 711/114 |
| 2003/0005354 A1 | * | 1/2003 | Kalman .......................... 714/7 |
| 2003/0217305 A1 | * | 11/2003 | Krehbiel et al. ................. 714/6 |

OTHER PUBLICATIONS www.foldoc.doc.ic.ac.uk/foldoc.cgi?ECC.*

(Continued)

*Primary Examiner*—Yolanda L Wilson
(74) *Attorney, Agent, or Firm*—Brooks Kushman P.C.

(57) ABSTRACT

A method, computer program product, and data processing system for continuously writing new data to a redundant array of independent storage devices without interrupting the writing of new data to the array to reconstruct missing data from a failed device or failed media is disclosed. A fault-tolerance scheme using multiple independent parity values is used to record data to the array. In the event that one of the volumes in the array fails, the remaining volumes continue being written to, but with fewer data or parity values being employed. The failed volume can then be reconstructed following the completion of writing the media set currently being written.

54 Claims, 9 Drawing Sheets

OTHER PUBLICATIONS

Patterson et al., "A Case for Redundant Arrays of Inexpensive Disks (RAID)", Computer Science Division, Department of Electrical Engineering and Computer Sciences, University of California, 1998 ACM, pp. 109-116.

Park et al., "Striping in Disk Array RM2 Enabling the Tolerance of Double Disk Failures", Department of Computer Science and Engineering/PIRL POSTECH, Korea, 1996, pp. 1-23.

Reddy et al., "An Evaluation of Multiple-Disk I/O Systems", IEEE Transactions on Computers, vol. 38, No. 12, Dec. 1989, pp. 1680-1690.

Reddy et al., "Design and Evaluation of Gracefully Degradable Disk Arrays", IBM Research, pp. 1-34.

Gibson et al., "Failure Correction Techniques for Large Disk Arrays", Computer Science Division, Electrical Engineering and Computer Sciences, University of California, 1989 ACM, pp. 123-132.

U.S. Appl. No. 10/280,426, filed Oct. 25, 2002, Le Graverand et al., Process for Generating and Reconstructing Variable Number of Parity for Byte Streams Independent of Host Block Size.

U.S. Appl. No. 09/638,205, filed Aug. 11, 2000, Debiez et al., Apparatus and Method for Writing and Reading Data To and From A Virtual Volume of Redundant Storage Devices.

\* cited by examiner

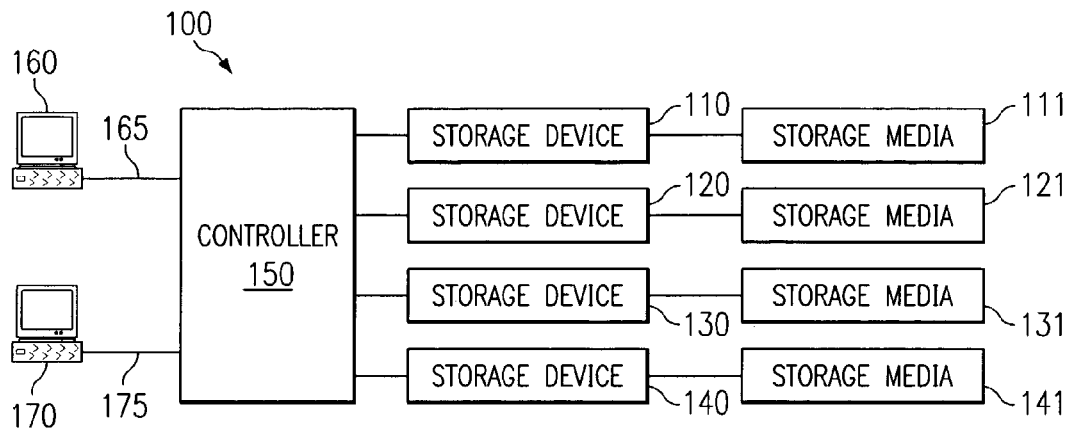
FIG. 1
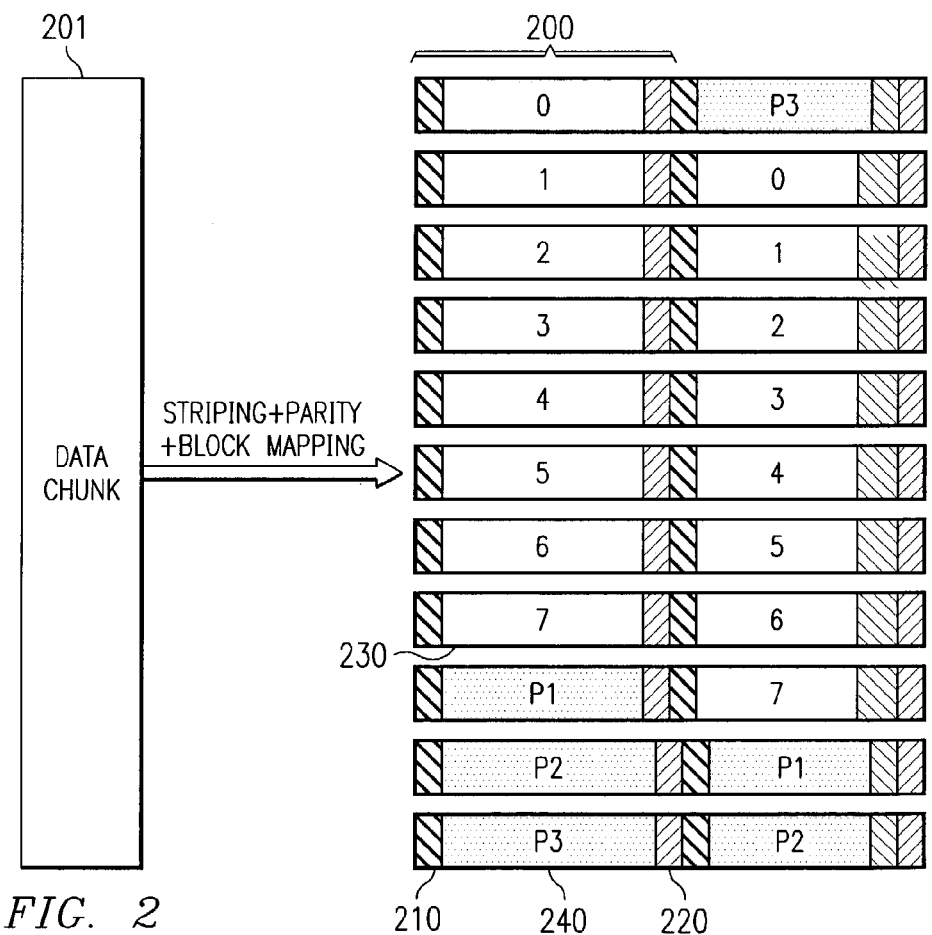
FIG. 2
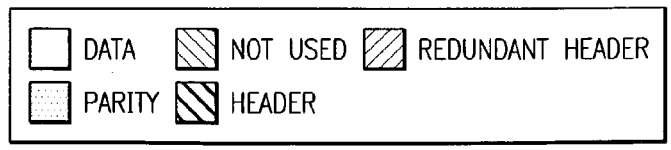

FIG. 3

| | 350 | 360 | | | | | | | | | |
|---|---|---|---|---|---|---|---|---|---|---|---|
| 301 STORAGE DEVICE | 0 | P2 | P1 | P0 | 7 | 6 | 5 | 4 | 3 | 2 | 1 | 0 |
| 302 STORAGE DEVICE | 1 | 0 | P2 | P1 | P0 | 7 | 6 | 5 | 4 | 3 | 2 | 1 |
| 303 STORAGE DEVICE | 2 | 1 | 0 | P2 | P1 | P0 | 7 | 6 | 5 | 4 | 3 | 2 |
| 304 STORAGE DEVICE | 3 | 2 | 1 | 0 | P2 | P1 | P0 | 7 | 6 | 5 | 4 | 3 |
| 305 STORAGE DEVICE | 4 | 3 | 2 | 1 | 0 | P2 | P1 | P0 | 7 | 6 | 5 | 4 |
| 306 STORAGE DEVICE | 5 | 4 | 3 | 2 | 1 | 0 | P2 | P1 | P0 | 7 | 6 | 5 |
| 307 STORAGE DEVICE | 6 | 5 | 4 | 3 | 2 | 1 | 0 | P2 | P1 | P0 | 7 | 6 |
| 308 STORAGE DEVICE | 7 | 6 | 5 | 4 | 3 | 2 | 1 | 0 | P2 | P1 | P0 | 7 |
| 309 STORAGE DEVICE | P0 | 7 | 6 | 5 | 4 | 3 | 2 | 1 | 0 | P2 | P1 | P0 |
| 310 STORAGE DEVICE | P1 | P0 | 7 | 6 | 5 | 4 | 3 | 2 | 1 | 0 | P2 | P1 |
| 311 STORAGE DEVICE | P2 | P1 | P0 | 7 | 6 | 5 | 4 | 3 | 2 | 1 | 0 | P2 |

FIG. 4

| | | | | | | | | | | | | |
|---|---|---|---|---|---|---|---|---|---|---|---|---|
| STORAGE DEVICE | 0 | P2 | P1 | P0 | 7 | 6 | 4 | 3 | 2 | 1 | 0 | P1 |
| STORAGE DEVICE | 1 | 0 | P2 | P1 | P0 | 7 | 5 | 4 | 3 | 2 | 1 | 0 |
| STORAGE DEVICE | 2 | 1 | 0 | P2 | P1 | P0 | 6 | 5 | 4 | 3 | 2 | 1 |
| STORAGE DEVICE | 3 | 2 | 1 | 0 | P2 | P1 | 7 | 6 | 5 | 4 | 3 | 2 |
| STORAGE DEVICE | 4 | 3 | 2 | 1 | 0 | P2 | P0 | 7 | 6 | 5 | 4 | 3 |
| STORAGE DEVICE | 5 | 4 | 3 | 2 | 1 | 0 | P1 | P0 | 7 | 6 | 5 | 4 |
| STORAGE DEVICE | 6 | 5 | 4 | 3 | 2 | 1 | 0 | P1 | P0 | 7 | 6 | 5 |
| 401 STORAGE DEVICE | 7 | 6 | 5 | 4 | 3 | 2 | /// | /// | /// | /// | /// | /// |
| 402 STORAGE DEVICE | P0 | 7 | 6 | 5 | 4 | 3 | 1 | 0 | P1 | P0 | 7 | 6 |
| STORAGE DEVICE | P1 | P0 | 7 | 6 | 5 | 4 | 2 | 1 | 0 | P1 | P0 | 7 |
| STORAGE DEVICE | P2 | P1 | P0 | 7 | 6 | 5 | 3 | 2 | 1 | 0 | P1 | P0 |

SIMULTANEOUS WRITING AND RECONSTRUCTION OF A REDUNDANT ARRAY OF INDEPENDENT LIMITED PERFORMANCE STORAGE DEVICES

CROSS REFERENCE TO RELATED APPLICATIONS

The present application is related to a U.S. patent application Ser. No. 10/280,426 entitled "PROCESS FOR GENERATING AND RECONSTRUCTING VARIABLE NUMBER OF PARITY FOR BYTE STREAMS INDEPENDENT OF HOST BLOCK SIZE," filed Oct. 25, 2002, which is hereby incorporated by reference. The present application is also related to a U.S. patent application entitled "APPARATUS AND METHOD FOR WRITING AND READING DATA TO AND FROM A VIRTUAL VOLUME OF REDUNDANT STORAGE DEVICES," application Ser. No. 09/638,205, filed Aug. 11, 2000, which is also hereby also incorporated by reference.

BACKGROUND OF THE INVENTION

1. Field of the Invention

The present invention relates to the writing of data to redundant arrays of independent storage devices. Specifically, the present invention addresses the problem of device failure during data writes.

2. Background of the Invention

In David A. Patterson, Garth Gibson, and Randy H. Katz, "A Case for Redundant Arrays of Inexpensive Disks (RAID)," *Proc. ACM SIGMOD Conference*, June 1988, the concept of RAID ("Redundant Arrays of Inexpensive Disks," also sometimes referred to in the literature as "Redundant Arrays of Independent Disks") was introduced. The basic concept of RAID is to replace a "Single Large Expensive Disk" (SLED), such as were commonly used in mainframe computers, with an array of smaller, lower-end "inexpensive disks," such as are used in personal computers, in order to increase performance while keeping costs down. Whereas a SLED might be capable of accessing one sector at a time, a RAID would utilize multiple disks operating in parallel to increase overall throughput by accessing multiple sectors at one time on different disks.

A RAID system may employ a technique called "striping" to distribute data across multiple disks. In striping, a sequence of portions of data (e.g., bits, bytes, disk sectors, tracks, etc.) is written in such a way that a portion is written to a first disk in the array, then the next portion is written to a second disk, and so on until each disk is written to. Then, the array of disks is cycled through again, so that the data is distributed across the array. Many different striping arrangements are possible in a RAID array using different sizes of data portions and different sequencing of the writes across the array.

Since RAID was intended to be used with "inexpensive" and presumably less reliable disks and because employing an array of disks greatly increases the likelihood of a failure (regardless of the quality of the disks), most RAID systems employ some kind of fault-tolerance or redundancy (the "R" in RAID). The original Patterson paper described several different "levels" of RAID, ranging from RAID Level 1 to Level 5, each with a different arrangement of data disks and "check" disks. The lower RAID Levels, Level 1 and Level 2, employ more expensive fault-tolerance techniques, such as mirroring (Level 1) and error correction codes (Level 2). The higher level RAID systems (Level 3 and above) store parity information.

The parity of a string of bits is the exclusive-or (XOR) over the entire string. The parity of a string of bits is "1" if the number of 1's appearing in the string of bits is an odd number (which is also referred to as having "odd parity"); if an even number of 1's appear in the string, the parity is "0" (even parity). Storing an additional parity bit along with a string of bits (such as a byte or word) allows a single-bit error to be corrected, provided the location of the error within the string is known. Generally, locating an error in an array of storage devices is not a problem, because the electronics in each storage device will generally be capable of detecting when the device has failed. If a storage device has failed, the missing data bit from that device can be reconstructed by XOR'ing bits from the other devices and comparing the result with the stored parity bit. If the two bits match, then the missing bit is a zero. If they do not, the missing bit is a one.

The most straightforward approach to calculate parity information in an array of storage devices is to execute the following process. For each address on the devices, XOR the data in each of the storage devices at that address (e.g., XOR the data at address 1 on disk 1 with the data at address 1 on disk 2, etc.). Such an arrangement is limited to correcting errors due to a single device failure, provided the identity of the failed device is known. This is referred to as a "single-dimension" parity calculation. Multiple-dimension parity calculations are also possible by calculating parity bits for various groupings of bits across the storage devices. Multiple-dimension parity information can be used to correct errors due to multiple device failures.

When one of the disks in a RAID fails, it can be replaced and the lost data recreated using parity information or other fault-tolerance techniques, such as error correcting codes or mirroring. Thus, in a sense, a RAID array acts as its own backup.

The basic RAID concept can be applied to other media besides disks. Clearly, any direct-access storage device (DASD) type, such as a CD-RW or memory, could be used to create a RAID-like array of storage devices. It is also possible to achieve fault-tolerance and performance benefits in "limited-performance" media such as tapes, by using a RAID-like array, called a RAIT (Redundant Array of Independent Tapes).

The term "limited-performance" media is used herein to denote storage media that exhibit performance limitations when operated in a random-access fashion. Examples of such performance limitations include, but are not limited to, slow seek or access time and inability to selectively overwrite portions of the storage media. Tape drives, for example, have a slow seek or access time, due to the fact that they operate on sequential access storage media (i.e., storage media that are accessed in a sequential fashion). Also, some tape drives are limited in their ability to selectively overwrite portions of a tape.

Reconstruction of an array of limited-performance devices after a device failure is more difficult than with a RAID. Because a RAID is comprised of direct-access storage devices (DASDs), it is possible to reconstruct a lost volume in the array while still writing new data to the array. The writes made to reconstruct the lost data are simply interspersed within the new data writes and the replacement storage device simply seeks back and forth between the portion of the storage space being reconstructed and the portion being written to with new data.

With an array of limited performance devices, such as a RAIT, however, random-access of the storage space is not possible, as tapes read and write data sequentially. Therefore, a more advanced form of reconstruction is needed in order to allow for continuous writing of new data to an array of limited performance devices even in the presence of a device or media failure.

SUMMARY OF THE INVENTION

The present invention provides a method, computer program product, and data processing system for continuously writing new data to a redundant array of independent storage devices without interrupting the writing of new data to the array to reconstruct missing data from a failed device or failed media. A fault-tolerance scheme using multiple independent parity values is used to record data to the array. In the event that one of the volumes in the array fails, the remaining volumes continue being written to, but with fewer data or parity values being employed. The failed volume can then be reconstructed following the completion of writing the media set currently being written.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an exemplary block diagram of a data processing system according to the present invention;

FIG. 2 is an exemplary diagram illustrating the manner in which a data chunk is striped with data and parity information and mapped to superblocks, which are then striped across a plurality of storage devices in a redundant array of storage devices;

FIG. 3 is an exemplary diagram illustrating a write rotation with regard to an array of storage devices;

FIG. 4 is an exemplary diagram illustrating an operation of a preferred embodiment of the present invention when a storage device in the array of storage devices fails;

DETAILED DESCRIPTION OF THE PREFERRED EMBODIMENT

Figure 5:
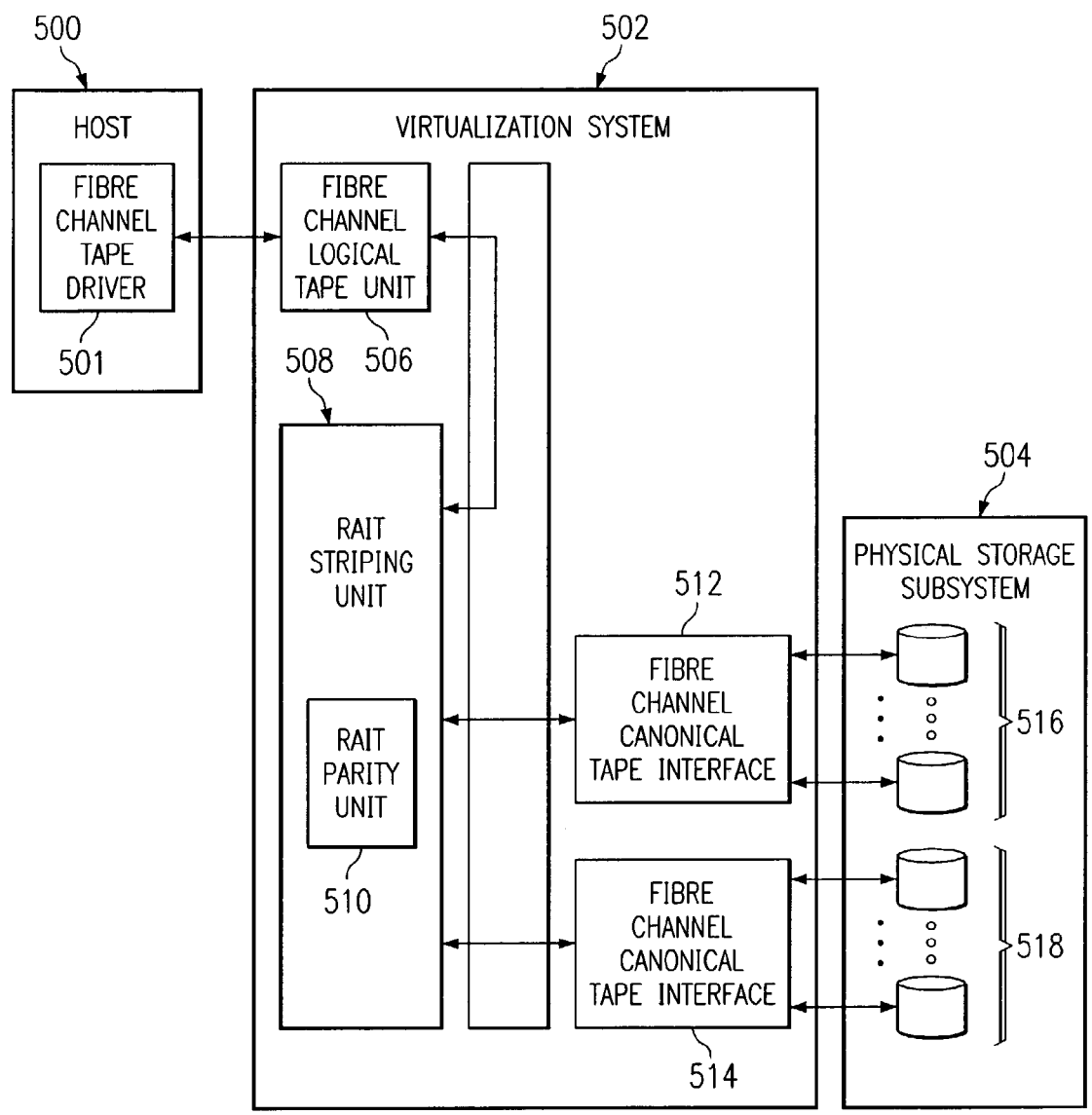
FIG. 5 is a diagram depicting an exemplary hardware configuration in which the teachings of the present invention may be applied.

FIG. 1 is an exemplary block diagram of a simple redundant array of storage devices 100, which may be, for example, a Redundant Array of Independent Tapes (RAIT). As shown in FIG. 1, array 100 includes a plurality of redundant storage devices 110-140, a controller 150, and a plurality of user devices 160 and 170.

Controller 150 controls the reading and writing of data across redundant storage devices 110, 120, 130, and 140. Storage devices 110, 120, 130, and 140 read from and write to storage media 111, 121, 131, and 141, which may be fixed or removable media. Controller 150 performs the functions described herein with regard to determining superblock headers, sending superblock header information, data and parity information to redundant storage devices 110, 120, 130, and 140 to be written to the storage media, modifying superblock headers, and the like. These operations are described in more detail at a later point in this document.

User devices 160 and 170 may be any type of data processing system capable of sending and receiving data via controller 150. For example, the user devices 160 and 170 may be mainframe computers, personal computers, network computers, workstations, personal digital assistants, and the like.

User devices 160 and 170 send and receive data to the controller 150 via communication links 165 and 175. Communication links 165 and 175 may be any type of data transfer communication links. For example, communication links 165 and 175 may be parallel or serial cables, co-axial cables, fiber optic cables, wireless communication links, and the like. Communication links 165 and 175 may further be part of a network such as a local area network, wide area network, intranet, the Internet, satellite communication network, and the like.

Redundant storage devices 110, 120, 130, and 140 may be any type of storage device that reads/writes data from/to a storage medium. The storage medium may be, for example, magnetic tape, magnetic disk, optical disk, CD-ROM, rewriteable CD-ROM, DVD, Magneto-optical medium, magnetic disk or tape cartridge, or the like. In a preferred embodiment of the present invention, the redundant storage devices are sequential storage devices, such as magnetic tape drives, although strictly speaking, the invention may be applied to any redundant storage system in which data is written to storage medium across a plurality of redundant storage devices.

The following description of the preferred embodiments of the invention will reference the storage device and the storage medium interchangeably. For purposes of this description, when the term "storage device" is utilized, what is meant is the storage device containing a storage medium. Thus, if data is written to a storage device, what is meant is that the data is sent to the storage device, which writes the data to the storage medium.

Also, it should be noted that the term "parity information" is used loosely within this description. While the term "parity information" is used to denote parity bits or parity values (i.e., the literal definition of "parity information"), it should also be understood that whenever parity information is referred to in this description of the present invention, it is implied that other error correction information, such as error correcting codes, mirrored data, or other redundant data, may be employed in addition to or in place of actual parity information. For example, the above-mentioned Patterson paper describes the use of error correcting codes, parity information, and mirroring in the various levels of RAID. One of ordinary skill in the art, therefore, will recognize that, in general, any reference to parity information in this description will apply equally to error correcting codes, mirrored data, or any other appropriate form of redundancy or error correction information.

To the user devices 160 and 170, the plurality of redundant storage devices 110, 120, 130, and 140 are seen as a single virtual device to which data is written and from which data is read. Thus, even though there are numerous physical storage devices employed, the user devices 160 and 170 access the physical storage devices as if they were a single storage device. Likewise, storage media 111, 121, 131, and 141 may be thought of as a single virtual volume of data accessible through a single virtual storage device.

Data written to redundant storage devices 110-140 is preferably written in the form of "superblocks." A superblock is a related collection of blocks of data. According to a preferred embodiment of the present invention, each block of a superblock resides on a separate storage device, so that the entire superblock may be read by reading from all of the storage devices simultaneously. In a preferred embodiment of the present invention, each superblock contains one or more data blocks containing the data to be stored in the array and one or more error correction blocks containing error correction information such as error correcting codes, mirrored data, or parity information.

The array of storage devices is itself a group of n+p physical volumes, i.e. physical storage devices, where n is the number of data blocks (also known as the "data striping width") and p is the number of parity blocks in each superblock. The following examples will assume n=8 and p=3, although the present invention is applicable to any relevant number of parity stripes and any data striping width.

FIG. 2 is an exemplary diagram illustrating the manner in which a data chunk is striped with data and parity information and mapped to superblocks, which are then striped across a plurality of storage devices in a virtual volume, such as storage devices 110-140. As shown in FIG. 2, each chunk of data (e.g., data chunk 201) is broken up and mapped into superblocks for storage on the plurality of storage devices. In a preferred embodiment, this involves breaking a larger data chunk into smaller blocks, assembling n of these blocks together with p blocks of parity or other error correction information and assigning the n+p blocks to appropriate storage devices in the array for storage. Each physical block is written to one of the storage media (111, 121, 131, and 141 in FIG. 1) in the array of storage devices. Thus, for example, the physical blocks 0-7 and P0-P3 represent a single superblock 200. The physical block length can be fixed or variable. For purposes of the present description, it is assumed that the physical block lengths are fixed.

In a preferred embodiment, each block in superblock 200 starts or ends with a 'header' 210. The header can be optionally repeated, as a redundant header 220, at the end of each physical block for checking and redundancy purposes. In a preferred embodiment, for any of the physical blocks inside the superblock 200, header 210 is identical from one block to the next, with the exception of the occurrence of a failure as will be discussed in detail hereafter.

Between header 210 and redundant header 220 (or the header of the next block in the case that redundant headers are not used), is written the data (230) or parity/error correction information (240) that is to be written to the storage media.

Header 210 may include sufficient information for reconstructing superblock 200 should an error occur in the writing or reading of information to or from the plurality of storage media. Header 210 may include any information that may be utilized for determining the organization of superblock 200. In a preferred embodiment, header 210 may include the following information in the following format:

{vv, n, p, k, pvidd$_0$ ... pvidd$_{n-1}$, pvidp$_0$ ... pvidp$_{p-1}$} where:
vv is the virtual volume identification;
n is the number of data blocks in the superblock;
p is the number of parity blocks in the superblock;
k is the present superblock sequence number;
pvidd$_i$ is the physical volume identifier for a data stripe I, I=0 ... n−1; and
pvidp$_j$ is the physical volume identifier for a parity stripe j, j=0 ... p−1.

The header format shown above represents a minimum amount of information that may be stored in the header according to the present invention. Additional information may be included in the header to make the header more versatile, as will be described hereafter.

From the header information, the redundant array system can determine the virtual volume (i.e., which array of storage devices or set of removable media) to which the data is written (vv), the number of data blocks that are written (n), the number of parity blocks that are written (p), the position of this superblock in a sequence of superblocks being written to or read from the storage device (k), and the particular storage devices on which the data and parity information are stored (pvidd$_i$ and pvidp$_j$). The virtual volume information may be used to determine which physical storage devices to be included in the array of storage devices to which data is written to or read from. The number of data blocks and parity blocks provides the system with an indication of what to expect when writing to or reading from the array of storage devices. The superblock sequence number provides an indication of which superblocks preceded the current superblocks and which superblocks are to follow the current superblock.

The data and parity information storage device identifiers may be used as an indication from which set of storage devices data and parity information is to be written or read from. The set of storage devices used can be changed for each superblock thus allowing for dynamic mapping of the superblocks across different sets of storage devices.

Thus, for example, in superblock 200 of FIG. 2, header 210 may take the form of:

{1, 8, 3, 101, 0-7, 8-10}

The header shown above represents a virtual volume identified as virtual volume 1. The virtual volume 1 has 8 data stripes, i.e. 8 data storage devices, and 3 parity stripes, i.e. 3 parity storage devices. Superblock 200 is number "101" in a sequence of superblocks, i.e. superblock 200 is between superblocks "100" and "102" in the sequence. The storage devices that store data corresponding to superblock 200 are storage devices 0-7. The storage devices that store parity information corresponding to superblock 200 are storage devices 8-10. As is apparent to those of ordinary skill in the art, the header described above, when implemented by a computer system, will be in a data format such as binary, hexadecimal, or the like.

With the present invention, a data chunk is preferably written to and read from a plurality of storage devices, such as redundant storage devices 110-140 in FIG. 1, in a rotating manner such as shown in FIG. 3 (although other arrangements of the blocks within a superblock are possible, as is generally known in the art—for example, the Patterson paper also describes non-rotating patterns with respect to certain RAID levels). As shown in FIG. 3, array 300 of redundant storage devices includes 8 data storage devices and 3 parity storage devices, for a total of 11 storage devices (n=8, p=3, n+p=11). Each row of storage device array 300 shown in FIG. 3 represents a single physical storage device from storage devices 301-311. All of the rows, and hence all of the physical storage devices, constitute a virtual volume. The non-shaded blocks numbered 0-7 in FIG. 3 represent blocks on data storage devices to which data is written or from which data is read (i.e., data blocks). The shaded blocks numbered P0-P2 represent parity storage devices to which parity information is written or from which parity information is read (i.e., parity blocks or error correction blocks). For purposes of the following description, only a write operation to the array of storage devices 300 will be described in detail. However, as will be apparent to those of ordinary skill in the art, the principles of the invention are also applicable to a read operation.

As shown, the data and parity information are written to array 300 in a rotating manner. Thus, for example, the first data block (i.e., data block "0") in superblock 350 is written to storage device 301 during a first write event. During the next write event for the next superblock (superblock 360), the third parity block (parity block "P2") is written to the first storage device 301 while the first data block (data block "0") is written to the second storage device 302.

When data compression is utilized, the parity information stored in the parity blocks will not be as easily compressed as the data since the parity generation process results in randomized parity information, which is less readily compressed. Therefore when compression is turned on at the drive level, an algorithmic method of distributing the writing of data and parity information, e.g., rotation, among the storage devices helps assure that the storage capacity of all of storage devices 301-311 is reached at approximately the same time.

For example, if a specific set of storage devices were always used to store the parity information while other storage devices were always used to store the data (as in RAID level 3, for example), the storage capacity of the parity storage device would be reached much earlier than the data storage devices. Therefore, in order to assure approximately the same amount of storage space on each of storage devices 301-311 for any given time, the data and parity information are written to storage devices 301-311 in an algorithmically determined manner. For the description of the preferred embodiment, it will be assumed that a rotating algorithmic mechanism is utilized (such as is employed in RAID level 5).

The parity information is used when, for example, data is corrupted and must be reconstructed. As is well known in the art, the parity information provides information from which, along with other uncorrupted data, the corrupted data may be reconstructed. A method of using parity information for reconstructing corrupted data is described in the incorporated U.S. patent application Ser. No. 10/280,426. Other parity methods may be utilized without departing from the spirit and scope of the present invention.

As information is written to array 300, header information, such as header 210, indicating the number of data blocks and parity blocks in each superblock as well as which storage devices store the data blocks and parity blocks for each superblock, is written to the storage devices for each block of information. Thus, for example, the header of the first superblock 350 may have the format {1, 8, 3, 101, 0-7, 8-10}. The header for the second superblock 360 may have the format {1, 8, 3, 102, 1-8, 0 and 9-10} indicating that the superblock 360, relative to superblock 350, is in the same volume, has the same number of data and parity blocks, is the next superblock in a sequence of superblocks, and has different physical devices storing the data and parity information.

The headers for the superblocks will change based on the virtual volume, number of data and parity blocks, superblock sequence number, and physical devices storing the data and parity information, as the superblocks are written to the virtual volume. However, each superblock header may be used to identify the superblock and the location of data and parity information for the superblock virtually independent of the other superblocks.

During writing or reading of information from a virtual volume, one or more of the physical storage devices in the array of storage devices may fail due to any number of reasons. The failure of a storage device may be determined, for example, based on an interrogation of the storage device prior to writing a superblock to the array of storage devices or may be determined based on the failure of a write attempt to the storage device.

The present invention provides a method, computer program product, and data processing system for recovering from a failure in a storage device in an array during writing, while allowing the writing to continue. According to a preferred embodiment of the present invention, in the event of a failure, the remaining operational storage devices continue to be used to write the data, but the number of parity blocks in each subsequently-written superblock is reduced to allow fewer storage devices to be used, bringing the number of devices in the array to n+p−1. A replacement device can then be used to store the missing information needed to make the n+p−1 device array into an n+p device array (i.e., the information already stored to the failed device, as well as the additional parity information not stored in the n+p−1 devices). Preparing the replacement device to contain the missing data from the failed device can take place independently of the writing of the remaining data to the remaining storage devices in the array and can take place at a later time, as will be shown.

FIG. 4 is a diagram depicting an example of a failure in a redundant array of storage devices in accordance with a preferred embodiment of the present invention. As shown in FIG. 4, during the writing of the seventh superblock, the storage device 401 fails. As a result, the number of parity blocks and thus, the number of parity storage devices is reduced from 3 to 2. The data that would have been written to storage device 401 is instead directed to storage device 402 and the rotation of the writing of data and parity information is continued with storage device 402. The storage device 401 is then removed from the rotation. One of ordinary skill in the art will recognize that the number of data blocks may be reduced instead of, or in addition to the number of parity blocks, without departing from the scope and spirit of the present invention (since the missing data blocks could be reproduced by xor'ing the parity blocks and the good data blocks).

The writing of the data that would have been written to storage device 401, to storage device 402, is facilitated in a preferred embodiment by the use of a buffer (not shown). In other words, as the data is being provided to the redundant array of storage devices for writing to the storage medium, the data is initially buffered. The buffer may be either in a controller system of the redundant array of storage devices, such as controller 150 for example, or in the storage devices themselves. In either case, in the event of a failure to write the data to a storage device, the data is not necessarily lost and may be recovered from the buffer. Thus, if a failure of a storage device is encountered, the data may be retrieved from the buffer and written to another location, such as a storage device designated for parity information, a spare storage device, or the like.

There are several methods for coordinating the discovery of a failed device during a write operation with the writing of the data to a reduced set of drives, including but not limited to:

1) each block written for a superblock is self consistent and contains metadata that describes its relationship to all the other blocks in the superblock. Therefore, when a read is expecting to encounter a P2 block and instead encounters a block that is a data block (in FIG. 4 this would be data block 0), the redundant array system (e.g., RAIT system) can, by convention or by specifically changing the metadata or by adding change notation to the metadata, assume that there has been an on the fly remapping of the use of the devices. This remapping is reflected in the metadata that is stored in the headers of subsequent superblocks;

2) at the point of failure, a new block is appended to the end of each of the data and parity blocks already written in the superblock. This new block is only a metadata block. The inserted metadata block describes the new mapping. An identical metadata block would then be placed both before and after the block that was moved to an alternative drive. When the blocks are read from the various media later, the reader would encounter the inserted metadata description instead of the expected P2 block and from that, discover that there had been a remapping and use the inserted block to understand the new structure. This method is less desirable than the first method from a performance standpoint since this method requires writing of additional blocks. However this method does provide a mechanism for identifying when the metadata in the superblock is correct and can be used directly.

Both methods could be supported in a single product with the choice being directed via installation settings or dynamically done by policy statements communicated independently to the subsystem at volume definition or even at mount time.

In FIG. 4, the reduction in available storage devices was handled by reducing the number of parity blocks in each superblock. As was stated earlier, in a preferred embodiment of the present invention, a reconstruction process uses a replacement device to store the information needed to make the now n+p−1 device array into an n+p device array. In a preferred embodiment, this is made possible through the use of a multi-dimensional parity scheme, wherein each parity block contains independently-calculated parity information obtained from grouping the data blocks into different parity groups. The incorporated application Ser. No. 10/280,426 "PROCESS FOR GENERATING AND RECONSTRUCTING VARIABLE NUMBER OF PARITY FOR BYTE STREAMS INDEPENDENT OF HOST BLOCK SIZE," accomplishes this by calculating the parity of diagonally arranged parity groups of differing slope. Using this arrangement, different blocks of parity information can be independently calculated and applied.

For example, one parity block within a superblock may be calculated using the parity group consisting of the data blocks in that superblock. Another parity block within the same superblock may be calculated using a parity group arranged diagonally across a number of superblocks. Yet another parity block within the same superblock may be calculated using another diagonally-arranged parity group of different slope. Each of these items of parity information is independent of the others, such that only one or a combination of a number of the parity blocks may be used to correct an error.

Thus, using a diagonal, multi-dimensional parity scheme, such as is described in the incorporated "PROCESS FOR GENERATING AND RECONSTRUCTING VARIABLE NUMBER OF PARITY FOR BYTE STREAMS INDEPENDENT OF HOST BLOCK SIZE" application, allows a preferred embodiment of the present invention to reduce the number of parity blocks in each superblock (as each block of parity information can be used independently of the others), while allowing the missing parity information to be reconstructed later without modifying the already-written parity information.

FIG. 5 is a diagram depicting an exemplary hardware configuration in which the teachings of the present invention may be applied. FIG. 5 includes a host computer system 500, a storage virtualization system 502, and a physical storage subsystem 504. Host 500 accesses storage virtualization system 502 as if storage virtualization system 502 were a single, monolithic storage device. Storage virtualization system 502, however, actually acts as an interface between host 500 and physical storage subsystem 504, which is made up of a number of storage devices. Storage virtualization system 502 can thus be thought of as a kind of controller (such as controller 150 in FIG. 1). In the case of a RAIT, as shown in FIG. 5, storage virtualization system 502 would serve as a "RAIT controller," for example. Storage virtualization system 502 might be, for instance, a StorageNet 6000 Storage Domain Manager from Storage Technology, Inc. of Louisville, Colo.

In a preferred embodiment, host 500 includes a tape driver 501 that interfaces with storage virtualization system 502 via a "logical tape" unit 506.

In order to write data to the RAIT provided by storage virtualization system 502, host 500 transmits the data to be stored to storage virtualization system 502 via logical tape unit 506, which passes the information to a RAIT striping unit 508. RAIT striping unit 508 divides that data into data blocks and arranges the data blocks into superblocks. RAIT striping unit 508 includes a RAIT parity unit 510, which generates parity blocks associated with the data blocks.

The data and parity blocks generated by RAIT striping unit 508 are then submitted via one of Fibre Channel Canonical Tape interfaces 512 and 514 to corresponding storage device arrays 516 and 518 in physical storage subsystem 504. Fibre Channel Canonical Tape interfaces 512 and 514 are hardware interfaces that map generic input/output transactions in the Fibre Channel protocol into commands for actual storage devices in physical storage subsystem 504.

Physical storage subsystem 504 is, in a preferred embodiment, simply a collection of storage devices (i.e., a storage device "farm"). As shown in the preferred embodiment of FIG. 5, physical storage subsystem 504 is divided into discrete arrays 516 and 518, each assigned to its own one of canonical tape interfaces 512 and 518, respectively. In an alternative embodiment, virtualization 502 may "pick and choose" to form a redundant array of storage devices from any number of storage devices in physical storage subsystem 504.

Figure 6:
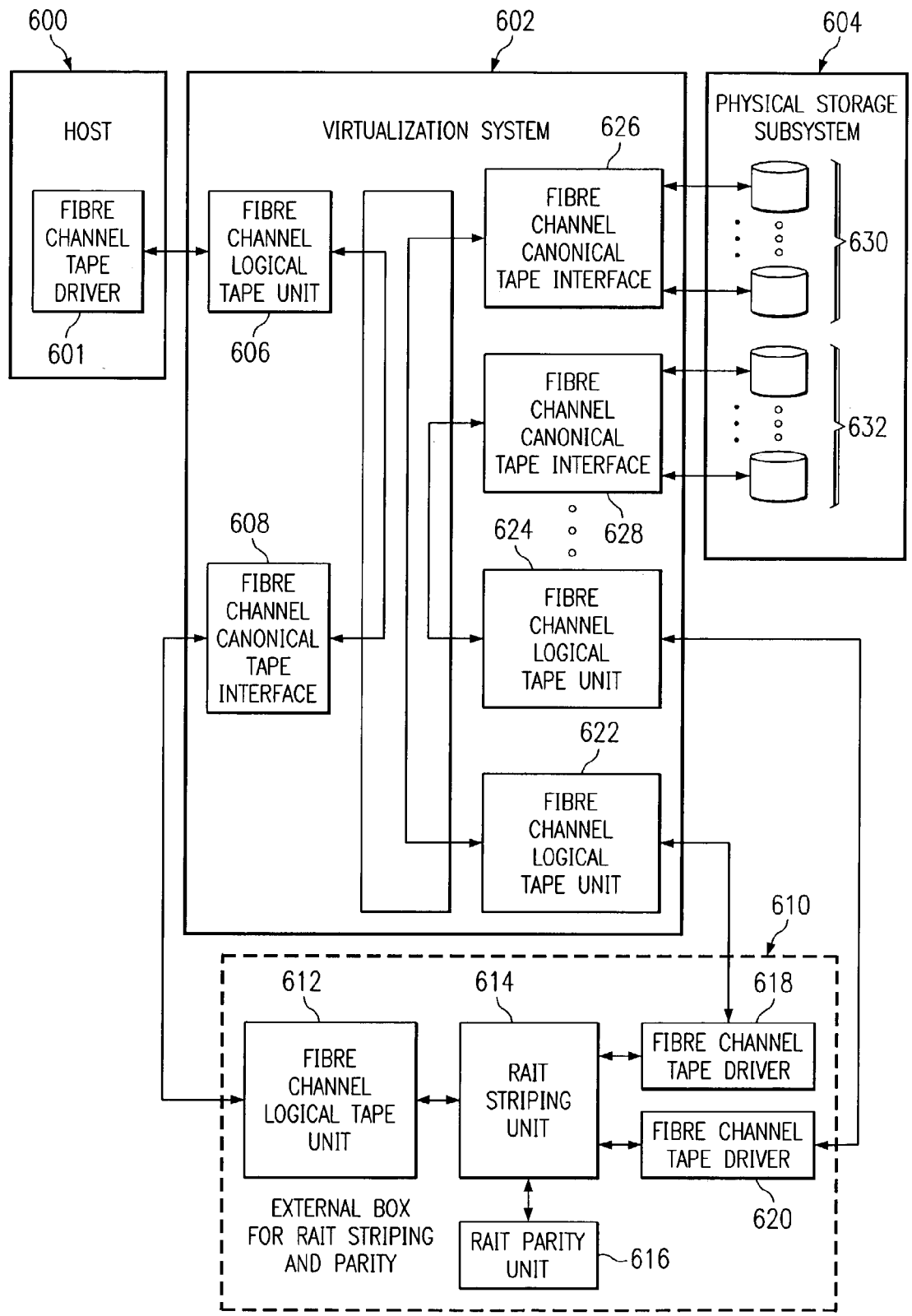
FIG. 6 is a diagram depicting an additional exemplary hardware configuration in which the teachings of the present invention may be applied.

FIG. 6 is a diagram depicting a variation on the hardware in FIG. 5 in which the RAIT striping and parity functionality is contained within a hardware unit external to storage visualization system 602, such as an external box or plug-in card.

Host 600 employs tape driver 601 to access storage virtualization system 602 via logical tape unit 606. Logical tape unit 606 is coupled to canonical tape interface 608, which provides an interface to external striping unit 610.

External striping unit 610 includes a logical tape unit 612, which takes its input from canonical tape interface 608. The data to be written to the RAIT is passed from logical tape unit 612 to RAIT striping unit 614, which divides the data into data blocks and arranges the data blocks into superblocks. RAIT parity unit 616 generates parity blocks associated with the data blocks made by RAIT striping unit 614. These data and parity blocks are output using one of tape drivers 618 and 620 and received by storage virtualization system 602 via one of logical tape units 622 and 624. The data and parity blocks are then written to one of storage device arrays 630 and 632 in physical storage subsystem 604 via the corresponding one of canonical tape interfaces 626 and 628.

In a preferred embodiment of the present invention, in the event of a device failure during writing, the writing process continues, with the number of parity blocks in each superblock reduced. The missing parity blocks and other information stored that would have been stored on the failed device can be restored to a replacement storage device, either following the completion of writing to the array of storage devices or concurrent with writing to the storage array.

Figure 7:
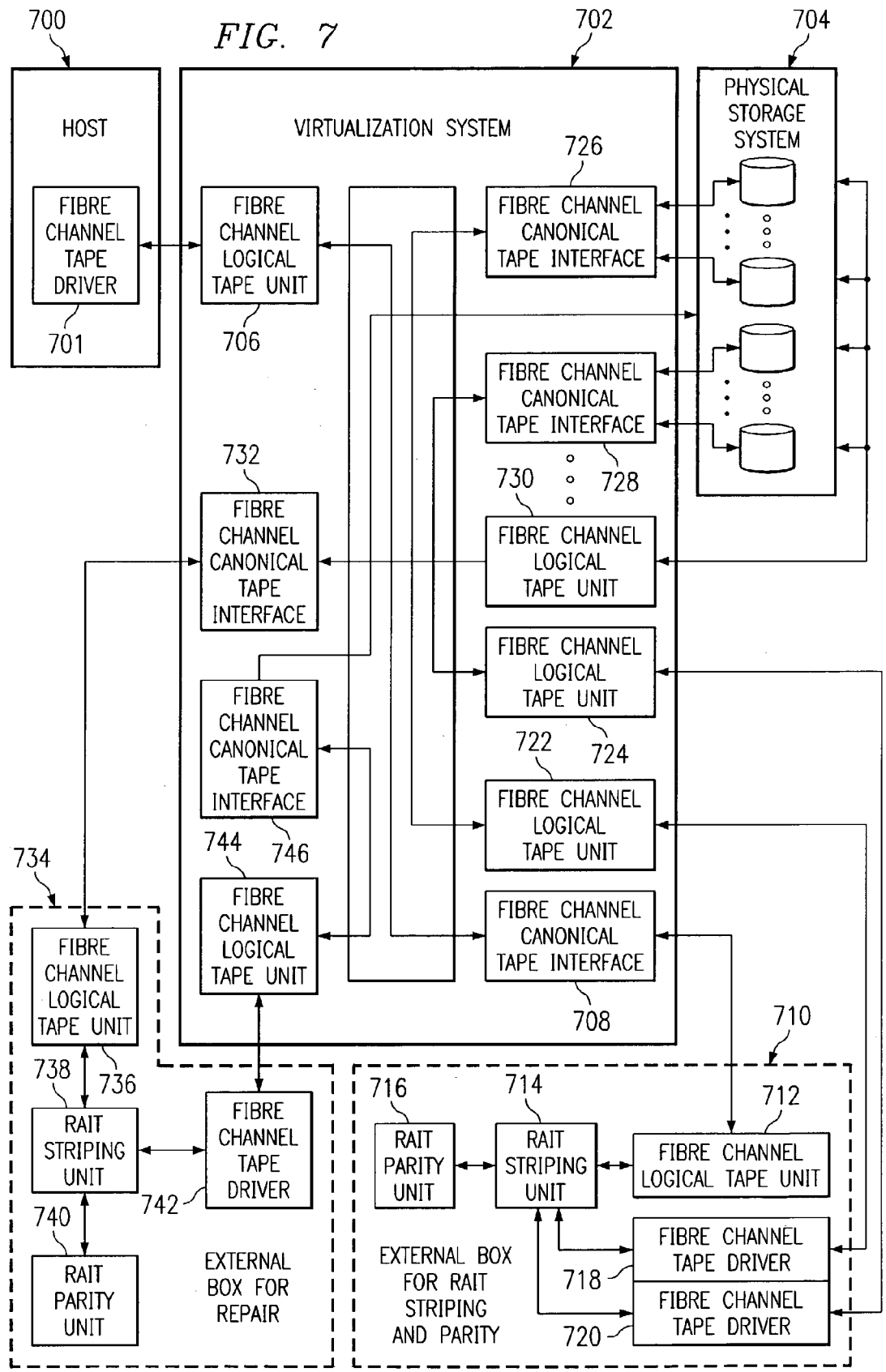
FIG. 7 is a diagram depicting device failure recovery in a preferred embodiment of the present invention.

FIG. 7 is a diagram depicting the operation of a preferred embodiment of the present invention in handling a device failure. It should be noted that although the embodiment described in FIG. 7 utilizes external striping units 710 and 734, the present invention could also be realized through the use of striping units internal to storage virtualization system 702.

Host 700 employs tape driver 701 to access storage virtualization system 702 via logical tape unit 706. Logical tape unit 706 is coupled to canonical tape interface 708, which provides an interface to external striping unit 710.

External striping unit 710 includes a logical tape 712, which takes its input from canonical tape interface 708. The data to be written to the RAIT is passed from logical tape unit 712 to RAIT striping unit 714, which divides the data into data blocks and arranges the data blocks into superblocks. RAIT parity unit 716 generates parity blocks associated with the data blocks made by RAIT striping unit 714. These data and parity blocks are output using one of tape drivers 718 and 720 and received by storage virtualization system 702 via one of logical tape units 722 and 724. The data and parity blocks are then written to physical storage subsystem 704 via the appropriate one of canonical tape interfaces 726 and 728.

In the event of a device failure physical storage subsystem continues to be written to, but with fewer parity devices. When the current set of devices or media (e.g., the current set of tapes) are finished being written to, either because the data stream to be written has ended or the ends of the tapes have been reached, the current set of tapes become available for reading. When this occurs, a preferred embodiment of the present invention will commence establishing a replacement device for the failed storage device. If the current set of devices or media is finished, but a subsequent set of devices or media is to be written, a different storage array from physical storage subsystem 704 can be used for to write the new information while the preparation of the replacement device takes place.

One of the devices in physical storage system 704 is designated as a replacement device. Then, the previously written information is read back from physical storage system 704 and transmitted to storage virtualization system 702, which receives the information via logical tape unit 730. The information is passed to canonical tape interface 732, which relays the information to external striping unit 734, which has been designated for use in restoring failed devices.

External striping unit 734 includes a logical tape unit 736, which takes its input from canonical tape interface 732. The data to be written to the RAIT is passed from logical tape unit 736 to RAIT striping unit 738, which divides the data into data blocks and arranges the data blocks into superblocks, as before. RAIT parity unit 740 generates parity blocks associated with the data blocks made by RAIT striping unit 734. The appropriate blocks to be placed on the replacement device are output using tape driver 742 and received by storage virtualization system 702 via logical tape unit 744. These blocks are then written to the replacement device in physical storage subsystem 704 via canonical tape interface 746.

In an alternative embodiment, if the storage devices in physical storage system 704 are capable of simultaneously reading and writing to the storage media, preparation of the replacement device need not be postponed until after the completion of the current set of devices or media, but may take place in parallel with writing the current set. In yet another alternative embodiment, a single external striping unit or an internal striping unit may be employed in place of the two external striping units (710 and 734) depicted in FIG. 8.

Figure 8:
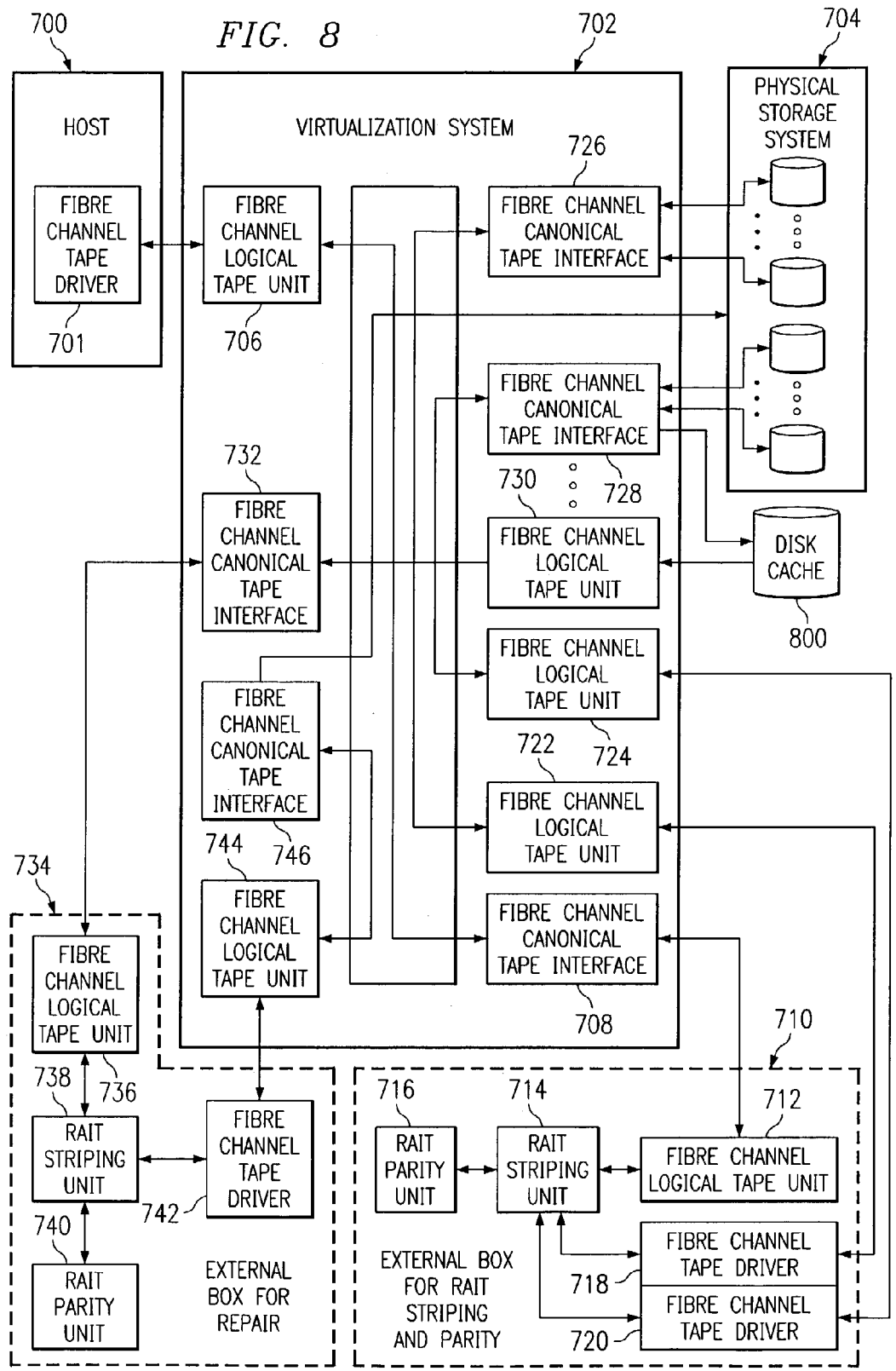
FIG. 8 is a diagram depicting device failure recovery in an alternative embodiment of the present invention.

In still another alternative embodiment, depicted in FIG. 8, information to be placed on the replacement device or information used in deriving the information to be placed on the replacement device may be written to a disk or memory cache 800. This information may then be either copied to the replacement device directly or, as shown in FIG. 8, input to logical tape unit 730 in order to allow external striping unit 734 to process the information in preparation for writing to the replacement device.

Figure 9:
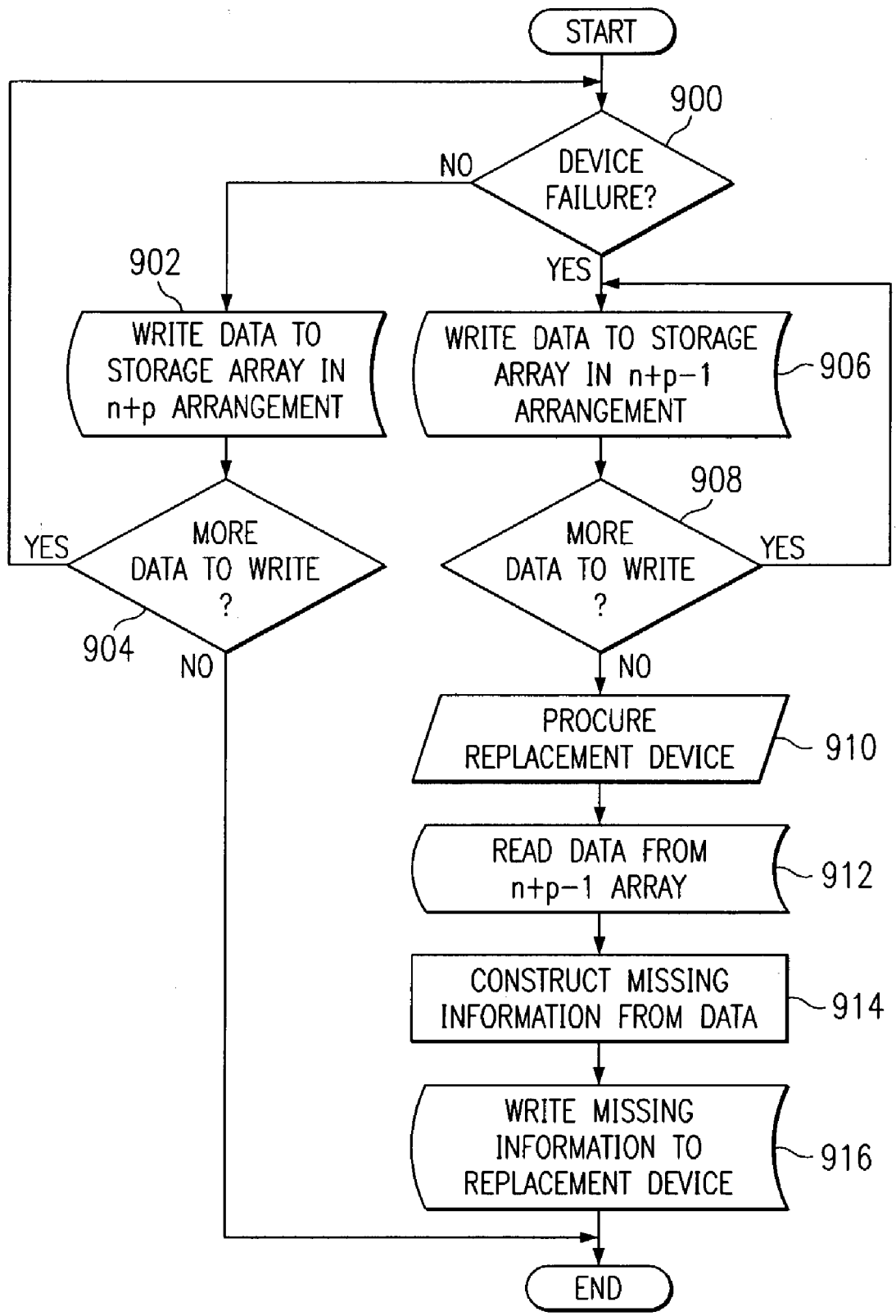
FIGS. 9-11 are flowchart representations of variant processes for device failure recovery in a redundant array of independent storage devices in accordance with a preferred embodiment of the present invention.
Figure 10:
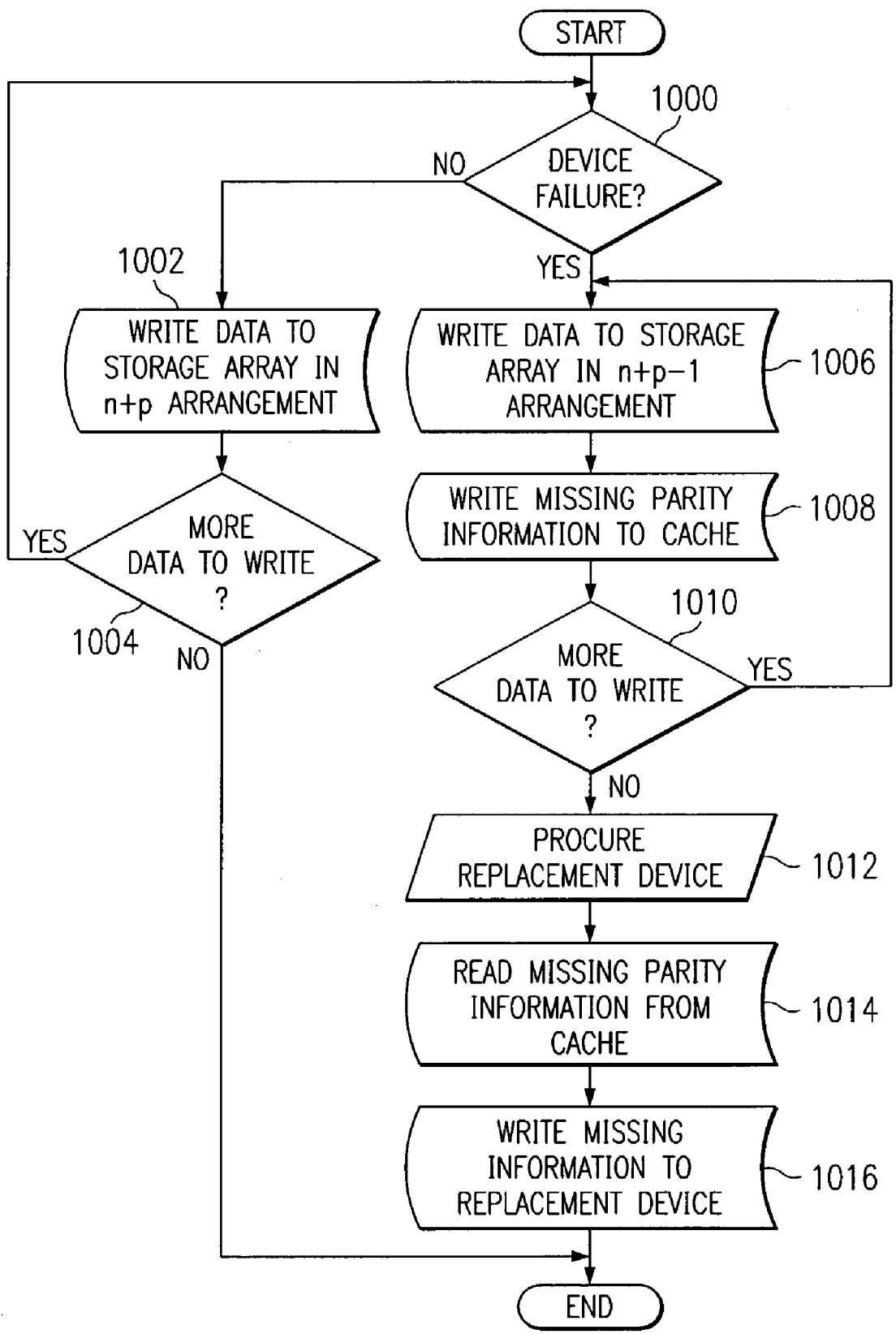

FIGS. 9-10 provide flowchart representations of processes of recovering from device failures in a storage device array in accordance with a preferred embodiment of the present invention. FIG. 9 is a flowchart representation of a process of recovering from a device failure following the completion of writing to a set of media or devices, such as a current set of tapes.

The process involves constantly monitoring for device failure (step 900). If no device has failed yet (step 900:No), a superblock of data is written to the redundant array of storage devices in an n+p format, where the number of data blocks in the superblock is n and the number of parity blocks or error correction blocks is p (step 902). If there is more data to write to the current set of media or devices (i.e., neither the end of the data nor the end of the media have been encountered) (step 904:Yes), the process loops back to step 900. Otherwise (step 904:No), the process terminates.

If a device failure occurs (step 900:Yes), the next superblock of information is written in n+p−1 format, where the number of data blocks is n and the number of parity blocks or error correction blocks is p−1 (step 906). If there is more data to write (step 908:Yes), step 906 is repeated until the end of the data or the end of the media (e.g., end of the tapes in a tape array). Once the end of the media or data is reached (step 908:No), a replacement device in the storage system is identified and procured (step 910).

The data written to the now n+p−1 device array is read back (step 912). The missing information to make the n+p−1 device array into an n+p device array is constructed from the read-back data (step 914). This missing data is then written to the replacement device (step 916).

FIG. 10 is a flowchart representation of a process of recovering from a device failure following the completion of writing to a set of media or devices, in which the process utilizes a cache to store the data for the replacement device. Like before, the process involves constantly monitoring for device failure (step 1000). If no device has failed yet (step 1000:No), a superblock of data is written to the redundant array of storage devices in an n+p format, where the number of data blocks in the superblock is n and the number of parity blocks or error correction blocks is p (step 1002). If there is more data to write to the current set of media or devices (i.e., neither the end of the data nor the end of the media have been encountered) (step 1004:Yes), the process loops back to step 1000. Otherwise (step 1004:No), the process terminates.

If a device failure occurs (step 1000:Yes), the next superblock of information is written in n+p−1 format, where the number of data blocks is n and the number of parity blocks or error correction blocks is p−1 (step 1006). The missing parity or error correction information is then stored in a disk or memory cache (step 1008). If there is more data to write (step 1010:Yes), steps 1006 and 1008 are repeated until the end of the data or the end of the media (e.g., end of the tapes in a tape array). Once the end of the media or data is reached (step 1010:No), a replacement device in the storage system is identified and procured (step 1012).

The missing information to be placed on the replacement device is read back from the cache (step 1014). This missing data is then written to the replacement device (step 1016).

Figure 11:
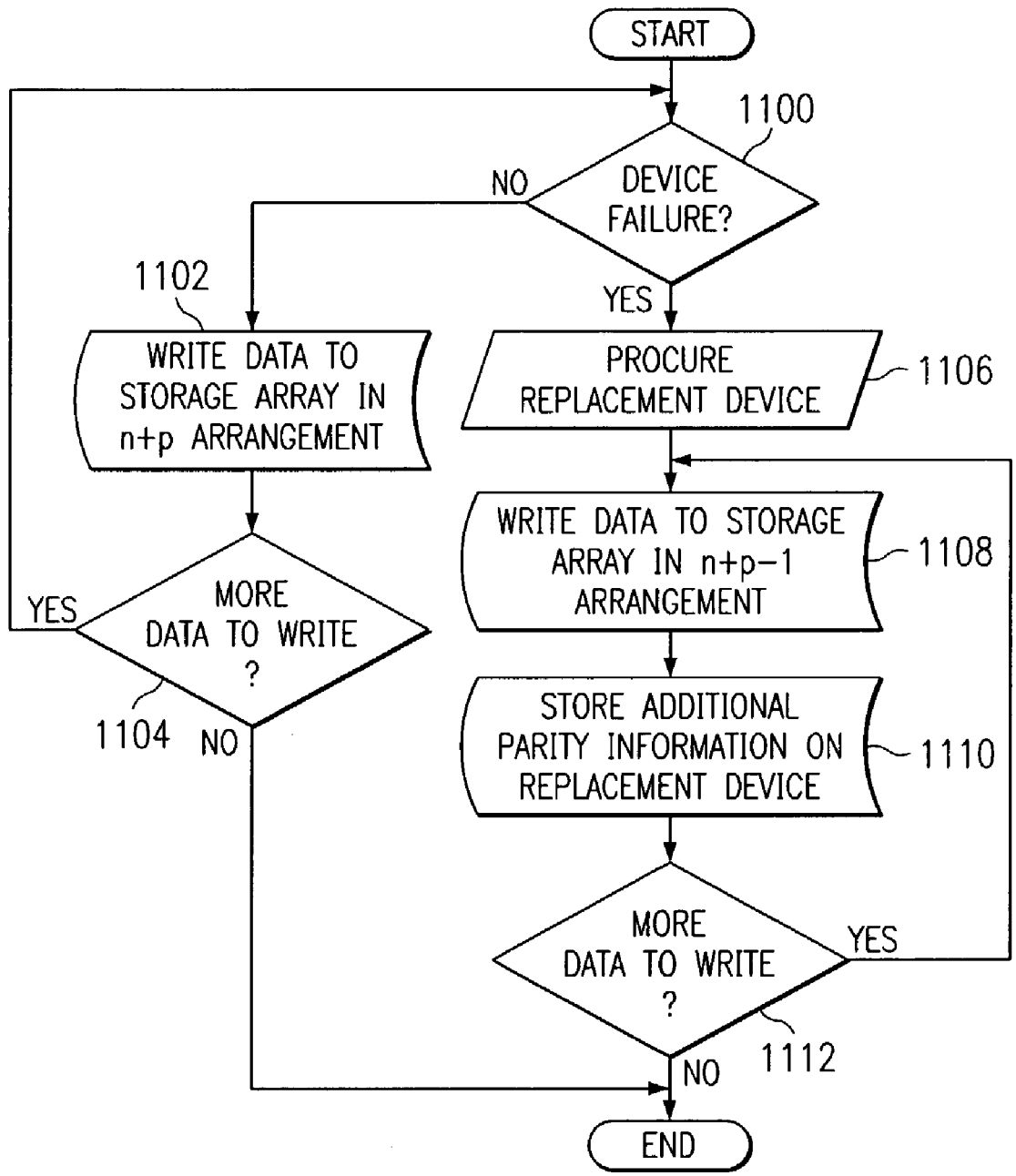

FIG. 11 is a flowchart representation of a process of recovering from a device failure in accordance with a preferred embodiment of the invention in which the preparation of a replacement device takes place concurrently with writing to the current set of devices or media. As in the previous figures, the process involves constantly monitoring for device failure (step 1100). If no device has failed yet (step 1100:No), a superblock of data is written to the redundant array of storage devices in an n+p format, where the number of data blocks in the superblock is n and the number of parity blocks or error correction blocks is p (step 1102). If there is more data to write to the current set of media or devices (i.e., neither the end of the data nor the end of the media have been encountered) (step 1104:Yes), the process loops back to step 1100. Otherwise (step 1104:No), the process terminates.

If a device failure occurs (step 1100:Yes), a replacement device in the storage system is identified and procured (step 1106). The next superblock of information is written in n+p−1 format, where the number of data blocks is n and the number of parity blocks or error correction blocks is p−1 (step 1108). The missing parity or error correction information is concurrently written to the replacement device (step 1110). If there is more data to write (step 1112:Yes), steps 1108 and 1110 are repeated until the end of the data or the end of the media (e.g., end of the tapes in a tape array). Once the end of the media or data is reached (step 1112:No), the process terminates.

It is important to note that while the present invention has been described in the context of a fully functioning data processing system, those of ordinary skill in the art will appreciate that the processes of the present invention are capable of being distributed in the form of a computer readable medium of instructions or other functional descriptive material and in a variety of other forms and that the present invention is equally applicable regardless of the particular type of signal bearing media actually used to carry out the distribution. Examples of computer readable media include recordable-type media, such as a floppy disk, tape, a hard disk drive, a RAM, CDs, DVDs, and transmission-type media, such as digital and analog communications links, wired or wireless communications links using transmission forms, such as, for example, radio frequency and light wave transmissions. The computer readable media may take the form of coded formats that are decoded for actual use in a particular data processing system. Functional descriptive material is information that imparts functionality to a machine. Functional descriptive material includes, but is not limited to, computer programs, instructions, rules, facts, definitions of computable functions, objects, and data structures.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system comprising:
writing a first superblock to a redundant array of storage devices, wherein the storage devices include storage media, and wherein the first superblock includes a first plurality of data blocks and a first plurality of error correction blocks, each of the first plurality of error correction blocks containing error correction information;
detecting a failure in a particular storage device in the redundant array of storage devices;
in response to detecting the failure, writing a second superblock to the redundant array of storage devices, wherein the second superblock includes a second plurality of data blocks and a second plurality of error correction blocks, wherein a combined cardinality of the second plurality of data blocks and the second plurality of error correction blocks is less than a combined cardinality of the first plurality of data blocks and the first plurality of error correction blocks;
detecting completion of writing to the redundant array of storage devices; and
in response to detecting the completion of writing to the redundant array of storage devices, writing at least one additional block corresponding to the second superblock to at least one replacement storage device.

2. The method of claim 1, wherein the at least one additional block includes a data block, and wherein metadata associated with the second superblock is modified to reflect a remapping of at least some of the second plurality of data blocks and the second plurality of error correction blocks written to the redundant array of storage devices, the remapping resulting from the failure of the particular storage device.

3. The method of claim 1, wherein the at least one additional block includes an error correction block, and wherein the second plurality of error correction blocks written to the redundant array of storage devices is less than the first plurality of error correction blocks written to the redundant array of storage devices.

4. The method of claim 1, wherein the storage media are sequential access storage media.

5. The method of claim 1, wherein the storage media include at least one of a magnetic disk, an optical disk, magnetic tape, optical tape, solid state memory, probe storage, and holographic storage.

6. The method of claim 1, wherein the redundant array of storage devices is a redundant array of independent tapes, and wherein the redundant array of independent tapes continues to be used for writing data notwithstanding the failure of a particular storage device.

7. The method of claim 1, wherein the storage media is removable media, and wherein the completion of writing to the redundant array of the storage devices is the completion of writing to a set of the removable media which are written to by a plurality of the storage devices configured as a single virtual storage device.

8. The method of claim 1, wherein the error correction information includes parity bits.

9. The method of claim 1, wherein the error correction information includes redundant codes.

10. The method of claim 1, wherein the error correction information includes redundant data.

11. The method of claim 1, wherein writing at least one additional block corresponding to the second superblock to at least one replacement storage device includes:
reading back the second plurality of data blocks and the second plurality of error correction blocks from the redundant array of storage devices; and
computing the at least one additional block based from data contained within the second plurality of data blocks and the second plurality of error correction blocks.

12. The method of claim 1, wherein writing at least one additional block corresponding to the second superblock to at least one replacement storage device includes:
reading, from a cache, cached data related to the second plurality of data blocks; and
deriving the at least one additional block from the cached data.

13. The method of claim 12, wherein the cached data includes data stored in the second plurality of data blocks and the at least one additional block is derived from the cached data by computing additional error correction information from the cached data.

14. The method of claim 12, wherein the cached data includes the at least one additional block and the at least one additional block is derived from the cached data by retrieving the at least one additional block from the cached data.

15. The method of claim 1, wherein the second plurality of error correction blocks includes fewer error correction blocks than the first plurality of error correction blocks.

16. The method of claim 1, wherein the second plurality of data blocks includes fewer data blocks than the first plurality of data blocks.

17. A method in a data processing system comprising:
writing a first superblock to a redundant array of storage devices, wherein the storage devices include storage media, and wherein the first superblock includes a first plurality of data blocks and a first plurality of error correction blocks, each of the first plurality of error correction blocks containing error correction information;
detecting a failure in a particular storage device in the redundant array of storage devices;
in response to detecting the failure, writing a second superblock of data from the original source to the redundant array of storage devices, wherein the second superblock includes a second plurality of data blocks and a second plurality of error correction blocks, wherein a combined cardinality of the second plurality of data blocks and the second plurality of error correction blocks is less than a combined cardinality of the first plurality of data blocks and the first plurality of error correction blocks;
generating, using cached data, at least one additional block corresponding to the second superblock; and
writing the at least one additional block to a replacement storage device concurrently with continuously writing additional superblocks to the redundant array of storage devices.

18. The method of claim 17, wherein the at least one additional block includes an error correction block.

19. The method of claim 17, wherein the at least one additional block includes a data block.

20. The method of claim 17, wherein the storage media are sequential access storage media.

21. The method of claim 17, wherein the storage media include at least one of a magnetic disk, an optical disk, magnetic tape, optical tape, solid state memory, probe storage, and holographic storage.

22. The method of claim 17, wherein the redundant array of storage devices is a redundant array of independent tapes, and wherein the redundant array of independent tapes continues to be used for writing data notwithstanding the failure of a particular storage device.

23. The method of claim 17, wherein the storage media is removable media, and wherein the completion of writing to the redundant array of the storage devices is the completion of writing to a set of the removable media which are written to by a plurality of the storage devices configured as a single virtual storage device.

24. The method of claim 17, wherein the error correction information includes parity bits.

25. The method of claim 17, wherein the error correction information includes error correcting codes.

26. The method of claim 17, wherein the error correction information includes redundant data.

27. A computer program product in a computer-readable storage medium comprising functional descriptive material that, when executed by a computer, enables the computer to perform acts including:
writing a first superblock to a redundant array of storage devices, wherein the storage devices include storage media, and wherein the first superblock includes a first plurality of data blocks and a first plurality of error correction blocks, each of the first plurality of error correction blocks containing error correction information;
detecting a failure in a particular storage device in the redundant array of storage devices;
in response to detecting the failure, writing a second superblock to the redundant array of storage devices, wherein the second superblock includes a second plurality of data blocks and a second plurality of error correction blocks, wherein a combined cardinality of the second plurality of data blocks and the second plurality of error correction blocks is less than a combined cardinality of the first plurality of data blocks and the first plurality of error correction blocks;
detecting completion of writing to the redundant array of storage devices; and
in response to detecting the completion of writing to the redundant array of storage devices, writing at least one additional block corresponding to the second superblock to at least one replacement storage device.

28. The computer program product of claim 27, wherein the at least one additional block includes a data block, and wherein metadata associated with the second superblock is modified to reflect a remapping of at least some of the second plurality of data blocks and the second plurality of error correction blocks written to the redundant array of storage devices, the remapping resulting from the failure of the particular storage device.

29. The computer program product of claim 27, wherein the at least one additional block includes an error correction block, and wherein the second plurality of error correction blocks written to the redundant array of storage devices is less than the first plurality of error correction blocks written to the redundant array of storage devices.

30. The computer program product of claim 27, wherein the storage media are sequential access storage media.

31. The computer program product of claim 27, wherein the storage media include at least one of a magnetic disk, an optical disk, magnetic tape, optical tape, solid state memory, probe storage, and holographic storage.

32. The computer program product of claim 27, wherein the redundant array of storage devices is a redundant array of independent tapes, and wherein the redundant array of independent tapes continues to be used for writing data notwithstanding the failure of the a particular storage device.

33. The computer program product of claim 27, wherein the storage media is removable media, and wherein the completion of writing to the redundant array of the storage devices is the completion of writing to a set of the removable media which are written to by a plurality of the storage devices configured as a single virtual storage device.

34. The computer program product of claim 27, wherein the error correction information includes parity bits.

35. The computer program product of claim 27, wherein the error correction information includes error correcting codes.

36. The computer program product of claim 27, wherein the error correction information includes redundant data.

37. The computer program product of claim 27, wherein writing at least one additional block corresponding to the second superblock to at least one replacement storage device includes:
  reading back the second plurality of data blocks and the second plurality of error correction blocks from the redundant array of storage devices; and
  computing the at least one additional block based from data contained within the second plurality of data blocks and the second plurality of error correction blocks.

38. The computer program product of claim 27, wherein writing at least one additional block corresponding to the second superblock to at least one replacement storage device includes:
  reading, from a cache, cached data related to the second plurality of data blocks; and
  deriving the at least one additional block from the cached data.

39. The computer program product of claim 38, wherein the cached data includes data stored in the second plurality of data blocks and the at least one additional block is derived from the cached data by computing additional error correction information from the cached data.

40. The computer program product of claim 38, wherein the cached data includes the at least one additional block and the at least one additional block is derived from the cached data by retrieving the at least one additional block from the cached data.

41. The computer program product of claim 27, wherein the second plurality of error correction blocks includes fewer error correction blocks than the first plurality of error correction blocks.

42. The computer program product of claim 27, wherein the second plurality of data blocks includes fewer data blocks than the first plurality of data blocks.

43. A computer program product in a computer-readable storage medium comprising functional descriptive material that, when executed by a computer, enables the computer to perform acts including:
  writing a first superblock to a redundant array of storage devices, wherein the storage devices include storage media, and wherein the first superblock includes a first plurality of data blocks and a first plurality of error correction blocks, each of the first plurality of error correction blocks containing error correction information;
  detecting a failure in a particular storage device in the redundant array of storage devices;
  in response to detecting the failure, writing a second superblock of data from the original source to the redundant array of storage devices, wherein the second superblock includes a second plurality of data blocks and a second plurality of error correction blocks, wherein a combined cardinality of the second plurality of data blocks and the second plurality of error correction blocks is less than a combined cardinality of the first plurality of data blocks and the first plurality of error correction blocks;
  generating, using cached data, at least one additional block corresponding to the second superblock; and
  writing the at least one additional block to a replacement storage device concurrently with continuously writing additional superblocks to the redundant array of storage devices.

44. The computer program product of claim 43, wherein the at least one additional block includes an error correction block.

45. The computer program product of claim 43, wherein the at least one additional block includes a data block.

46. The computer program product of claim 43, wherein the storage media are sequential access storage media.

47. The computer program product of claim 43, wherein the storage media include at least one of a magnetic disk, an optical disk, magnetic tape, optical tape, solid state memory, probe storage, and holographic storage.

48. The computer program product of claim 43, wherein the redundant array of storage devices is a redundant array of independent tapes, and wherein the redundant array of independent tapes continues to be used for writing data notwithstanding the failure of a particular storage device.

49. The computer program product of claim 43, wherein the storage media is removable media, and wherein the completion of writing to the redundant array of the storage devices is the completion of writing to a set of the removable media which are written to by a plurality of the storage devices configured as a single virtual storage device.

50. The computer program product of claim 43, wherein the error correction information includes parity bits.

51. The computer program product of claim 43, wherein the error correction information includes error correcting codes.

52. The computer program product of claim 43, wherein the error correction information includes redundant data.

53. A data processing system comprising:
- means for writing a first superblock to a redundant array of storage devices, wherein the storage devices include storage media, and wherein the first superblock includes a first plurality of data blocks and a first plurality of error correction blocks, each of the first plurality of error correction blocks containing error correction information;
- means for detecting a failure in a particular storage device in the redundant array of storage devices;
- means, responsive to detecting the failure, for writing a second superblock to the redundant array of storage devices, wherein the second superblock includes a second plurality of data blocks and a second plurality of error correction blocks, wherein a combined cardinality of the second plurality of data blocks and the second plurality of error correction blocks is less than a combined cardinality of the first plurality of data blocks and the first plurality of error correction blocks;
- means for detecting completion of writing to the redundant array of storage devices; and
- means, responsive to detecting the completion of writing to the redundant array of storage devices, for writing at least one additional block corresponding to the second superblock to at least one replacement storage device.

54. A data processing system comprising:
- means for writing a first superblock to a redundant array of storage devices, wherein the storage devices include storage media, and wherein the first superblock includes a first plurality of data blocks and a first plurality of error correction blocks, each of the first plurality of error correction blocks containing error correction information;
- means for detecting a failure in a particular storage device in the redundant array of storage devices;
- means, responsive to detecting the failure, for writing a second superblock of data from the original source to the redundant array of storage devices, wherein the second superblock includes a second plurality of data blocks and a second plurality of error correction blocks, wherein a combined cardinality of the second plurality of data blocks and the second plurality of error correction blocks is less than a combined cardinality of the first plurality of data blocks and the first plurality of error correction blocks;
- means for generating, using cached data, at least one additional block corresponding to the second superblock; and
- means for writing the at least one additional block to a replacement storage device concurrently with continuously writing additional superblocks to the redundant array of storage devices.

* * * * *